United States Patent
Nam et al.

(10) Patent No.: US 11,622,321 B2
(45) Date of Patent: Apr. 4, 2023

(54) TWO-STAGE SYSTEM INFORMATION UPDATE

(71) Applicant: QUALCOMM Incorporated, San Diego, CA (US)

(72) Inventors: Wooseok Nam, San Diego, CA (US); Tao Luo, San Diego, CA (US); Peter Gaal, San Diego, CA (US); Ozcan Ozturk, San Diego, CA (US); Junyi Li, Fairless Hills, PA (US); Iyab Issam Sakhnini, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 63 days.

(21) Appl. No.: 17/444,542

(22) Filed: Aug. 5, 2021

(65) Prior Publication Data
US 2022/0046523 A1    Feb. 10, 2022

Related U.S. Application Data

(60) Provisional application No. 62/706,289, filed on Aug. 7, 2020.

(51) Int. Cl.
*H04W 48/16* (2009.01)
*H04W 48/12* (2009.01)

(52) U.S. Cl.
CPC .......... *H04W 48/16* (2013.01); *H04W 48/12* (2013.01)

(58) Field of Classification Search
CPC .............................. H04W 48/16; H04W 48/12
See application file for complete search history.

(56) References Cited

U.S. PATENT DOCUMENTS

| | | | |
|---|---|---|---|
| 11,039,442 B2 * | 6/2021 | Yamada | H04W 72/02 |
| 2017/0374491 A1 | 12/2017 | Xiao et al. | |
| 2018/0255606 A1 | 9/2018 | Lee et al. | |

FOREIGN PATENT DOCUMENTS

| | | |
|---|---|---|
| WO | 2018016922 A1 | 1/2018 |
| WO | 2019196933 A1 | 10/2019 |

OTHER PUBLICATIONS

International Search Report and Written Opinion—PCT/US2021/071136—ISA/EPO—dated Nov. 25, 2021.

* cited by examiner

*Primary Examiner* — Diane D Mizrahi
(74) *Attorney, Agent, or Firm* — Harrity & Harrity, LLP

(57) ABSTRACT

Various aspects of the present disclosure generally relate to wireless communication. In some aspects, a user equipment (UE) may receive a first system information update notification and a second system information update notification. The UE may decode, based at least in part on information included in the first system information update notification, the second system information update notification to identify one or more system information blocks that are to be updated. The UE may update the one or more system information blocks based at least in part on decoding the second system information update notification. Numerous other aspects are provided.

30 Claims, 8 Drawing Sheets

TWO-STAGE SYSTEM INFORMATION UPDATE

CROSS-REFERENCE TO RELATED APPLICATION

This Patent Applications claims priority to U.S. Provisional Patent Application No. 62/706,289, filed on Aug. 7, 2020, entitled "TWO-STAGE SYSTEM INFORMATION UPDATE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for two-stage system information update.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: receiving a first system information update notification and a second system information update notification; decoding, based at least in part on information included in the first system information update notification, the second system information update notification to identify one or more system information blocks that are to be updated; and updating the one or more system information blocks based at least in part on decoding the second system information update notification.

In some aspects, a UE for wireless communication includes a memory and one or more processors coupled to the memory. The memory and the one or more processors configured to: receive a first system information update notification and a second system information update notification; decode, based at least in part on information included in the first system information update notification, the second system information update notification to identify one or more system information blocks that are to be updated; and update the one or more system information blocks based at least in part on decoding the second system information update notification.

In some aspects, a non-transitory computer-readable medium storing a set of instructions for wireless communication includes: one or more instructions that, when executed by one or more processors of a UE, cause the UE to: receive a first system information update notification and a second system information update notification; decode, based at least in part on information included in the first system information update notification, the second system information update notification to identify one or more system information blocks that are to be updated; and update the one or more system information blocks based at least in part on decoding the second system information update notification.

In some aspects, an apparatus for wireless communication includes: means for receiving a first system information update notification and a second system information update notification; means for decoding, based at least in part on information included in the first system information update notification, the second system information update notification to identify one or more system information blocks that are to be updated; and means for updating the one or more system information blocks based at least in part on decoding the second system information update notification.

Some aspects described herein relate to a base station for wireless communication. The base station may include a memory and one or more processors coupled to the memory. The one or more processors may be configured to generate a first system information update notification and a second system information update notification, where the first system information update notification includes information associated with decoding the second system information update notification, and where the second system information update notification is associated with identifying one or more system information blocks that are to be updated. The one or more processors may be configured to transmit a first system information update notification and a second system information update notification to trigger the update to the one or more system information blocks.

Some aspects described herein relate to a method of wireless communication performed by a base station. The method may include generating a first system information update notification and a second system information update notification, where the first system information update notification includes information associated with decoding the second system information update notification, and where the second system information update notification is associated with identifying one or more system information blocks that are to be updated. The method may include transmitting a first system information update notification and a second system information update notification to trigger the update to the one or more system information blocks.

Some aspects described herein relate to a non-transitory computer-readable medium that stores a set of instructions for wireless communication by a base station. The set of instructions, when executed by one or more processors of the base station, may cause the base station to generate a first system information update notification and a second system information update notification, where the first system information update notification includes information associated with decoding the second system information update notification, and where the second system information update notification is associated with identifying one or more system information blocks that are to be updated. The set of instructions, when executed by one or more processors of the base station, may cause the base station to transmit a first system information update notification and a second system information update notification to trigger the update to the one or more system information blocks.

Some aspects described herein relate to an apparatus for wireless communication. The apparatus may include means for generating a first system information update notification and a second system information update notification, where the first system information update notification includes information associated with decoding the second system information update notification, and where the second system information update notification is associated with identifying one or more system information blocks that are to be updated. The apparatus may include means for transmitting a first system information update notification and a second system information update notification to trigger the update to the one or more system information blocks.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
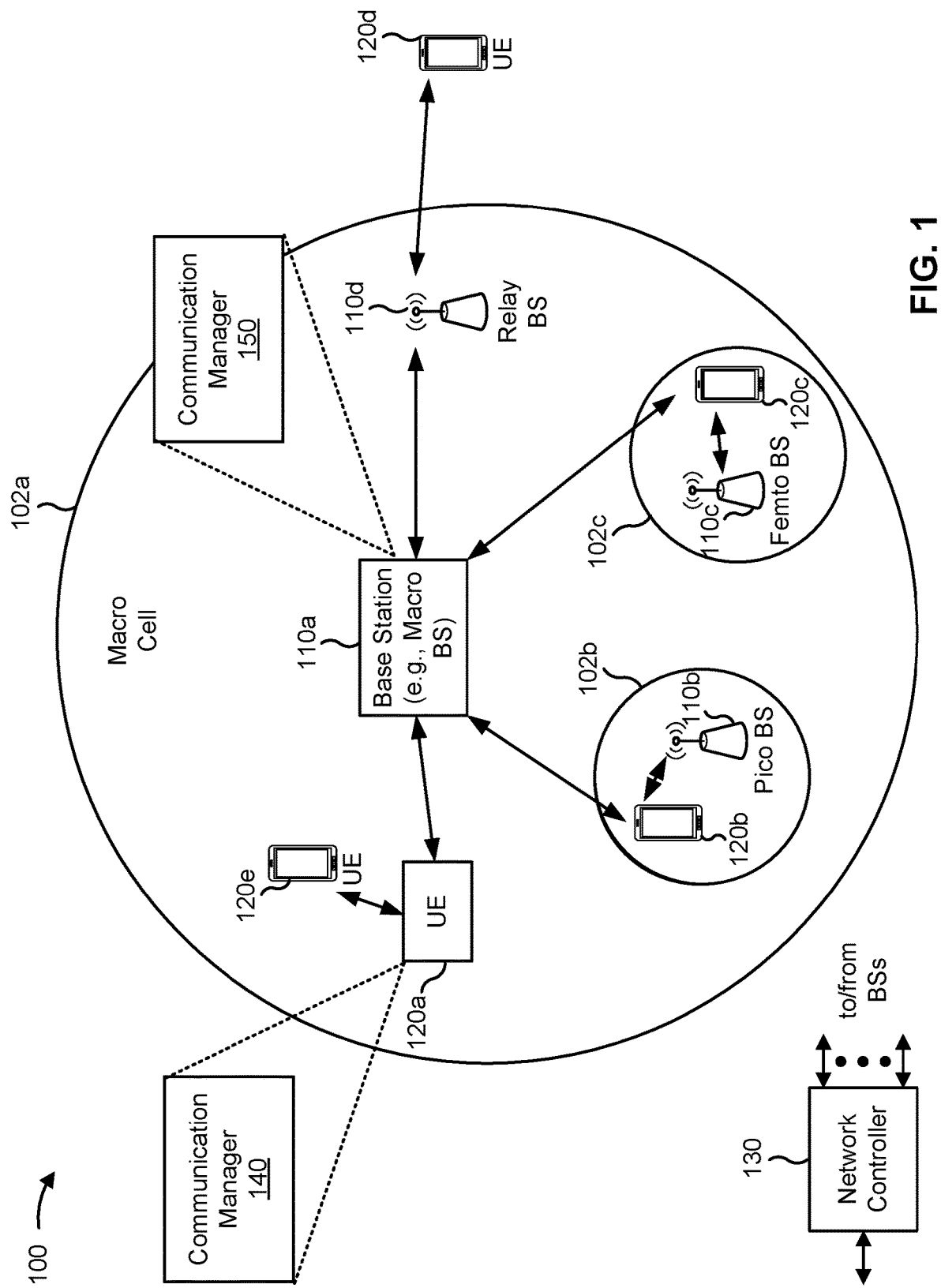
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a base station) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

A base station (e.g., the base station 110) may serve different UEs (e.g., UEs 120) of different categories and/or different UEs that support different capabilities. For example, the base station may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category, and may be referred to as a reduced capability (RedCap) UE, a low tier UE, and/or an NR-Lite UE, among other examples. A UE of the first category may be, for example, an MTC UE, an eMTC UE, and/or an IoT UE, as described above in connection with FIG. 1. A UE of the second category may have an advanced feature set compared to UEs of the second category, and may be referred to as a baseline UE, a high tier UE, an NR UE, and/or a premium UE, among other examples. A UE of the first category has capabilities that satisfy requirements of a first (earlier) wireless communication standard but not a second (later) wireless communication standard, while a UE of the second category has capabilities that satisfy requirements of the second (later) wireless communication standard (and also the first wireless communication standard, in some cases).

For example, UEs of the first category may support a lower maximum modulation and coding scheme (MCS) than UEs of the second category (e.g., quadrature phase shift keying (QPSK) or the like as compared to 256-quadrature amplitude modulation (QAM) or the like), may support a lower maximum transmit power than UEs of the second category, may have a less advanced beamforming capability than UEs of the second category (e.g., may not be capable of forming as many beams as UEs of the second category), may require a longer processing time than UEs of the second category, may include less hardware than UEs of the second category (e.g., fewer antennas, fewer transmit antennas, and/or fewer receive antennas), and/or may not be capable of communicating on as wide of a maximum bandwidth part as UEs of the second category, among other examples. Additionally, or alternatively, UEs of the second category may be capable of communicating using a shortened transmission time interval (TTI) (e.g., a slot length of 1 ms or less, 0.5 ms, 0.25 ms, 0.125 ms, 0.0625 ms, or the like, depending on a sub-carrier spacing), and UEs of the first category may not be capable of communicating using the shortened TTI.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a first system information update notification and a second system information update notification; decode, based at least in part on information included in the first system information update notification, the second system information update notification to identify one or more system information blocks that are to be updated; and update the one or more system information blocks based at least in part on decoding the second system information update notification. Additionally, or alternatively, the communication manager 140 may perform one or more other operations described herein.

In some aspects, the base station 110 may include a communication manager 150. As described in more detail elsewhere herein, the communication manager 150 may generate a first system information update notification and a second system information update notification, wherein the first system information update notification includes information associated with decoding the second system information update notification, and wherein the second system information update notification is associated with identifying one or more system information blocks that are to be updated; and transmit a first system information update notification and a second system information update notification to trigger the update to the one or more system information blocks. Additionally, or alternatively, the communication manager 150 may perform one or more other operations described herein.

As indicated above, FIG. 1 is provided as an example. Other examples may differ from what is described with regard to FIG. 1.

Figure 2:
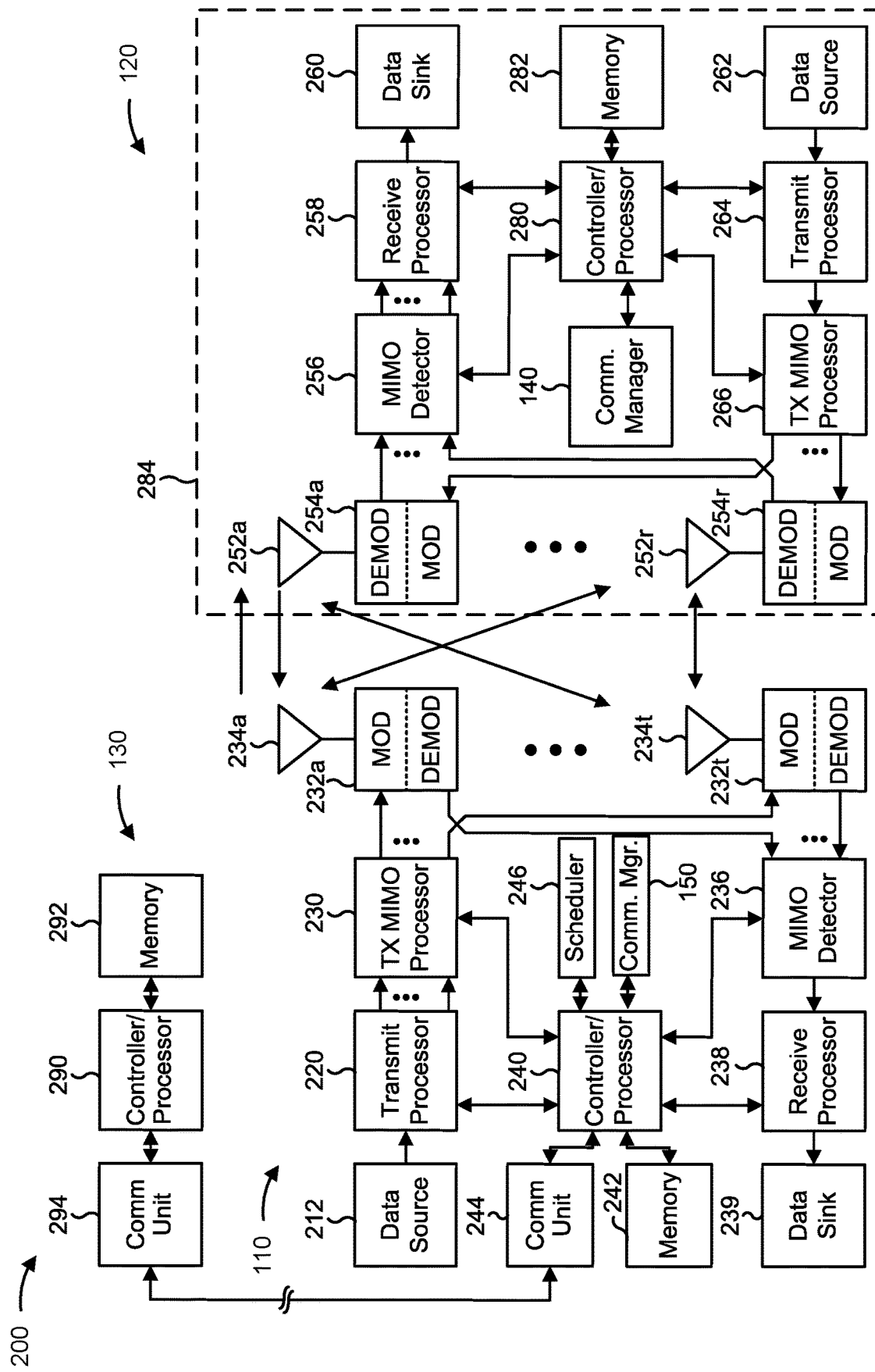
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-6).

The controller/processor 240 of the base station 110, the controller/processor 280 of the UE 120, and/or any other component(s) of FIG. 2 may perform one or more techniques associated with two-stage system information update, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5 and/or other processes as described herein. In some examples, executing instructions may include running the instructions, converting the instructions, compiling the instructions, and/or interpreting the instructions, among other examples.

In some aspects, a UE 120 includes means for receiving a first system information update notification and a second system information update notification; means for decoding, based at least in part on information included in the first system information update notification, the second system information update notification to identify one or more system information blocks that are to be updated; and/or means for updating the one or more system information blocks based at least in part on decoding the second system information update notification. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for generating a first system information update notification and a second system information update notification, wherein the first system information update notification includes information associated with decoding the second system information update notification, and wherein the second system information update notification is associated with identifying one or more system information blocks that are to be updated; and/or means for transmitting a first system information update notification and a second system information update notification to trigger the update to the one or more system information blocks. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Fig. While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
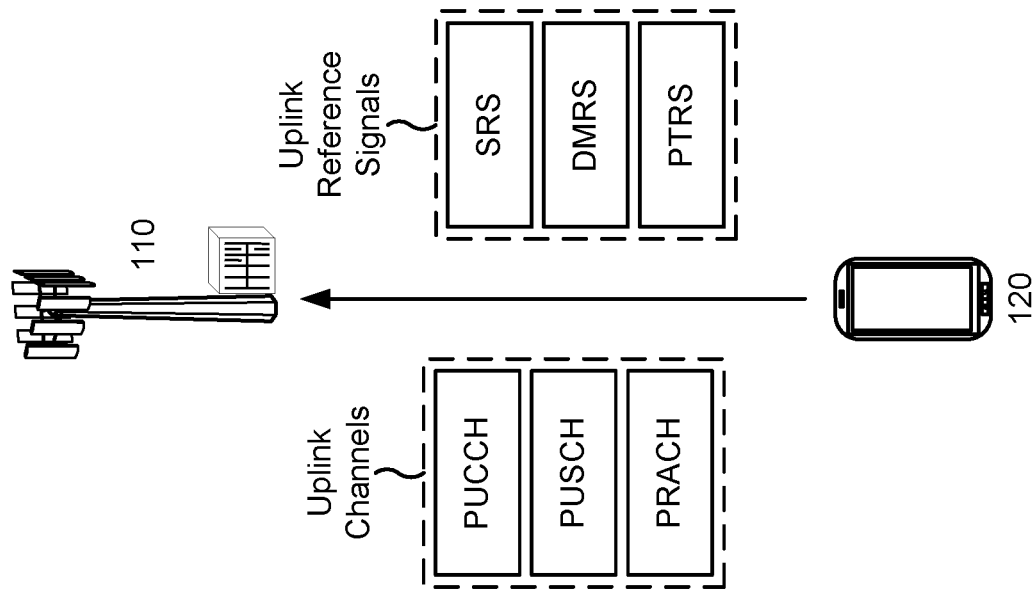
FIG. 3 is a diagram illustrating an example of physical channels and reference signals in a wireless network, in accordance with the present disclosure.
Figure 3:
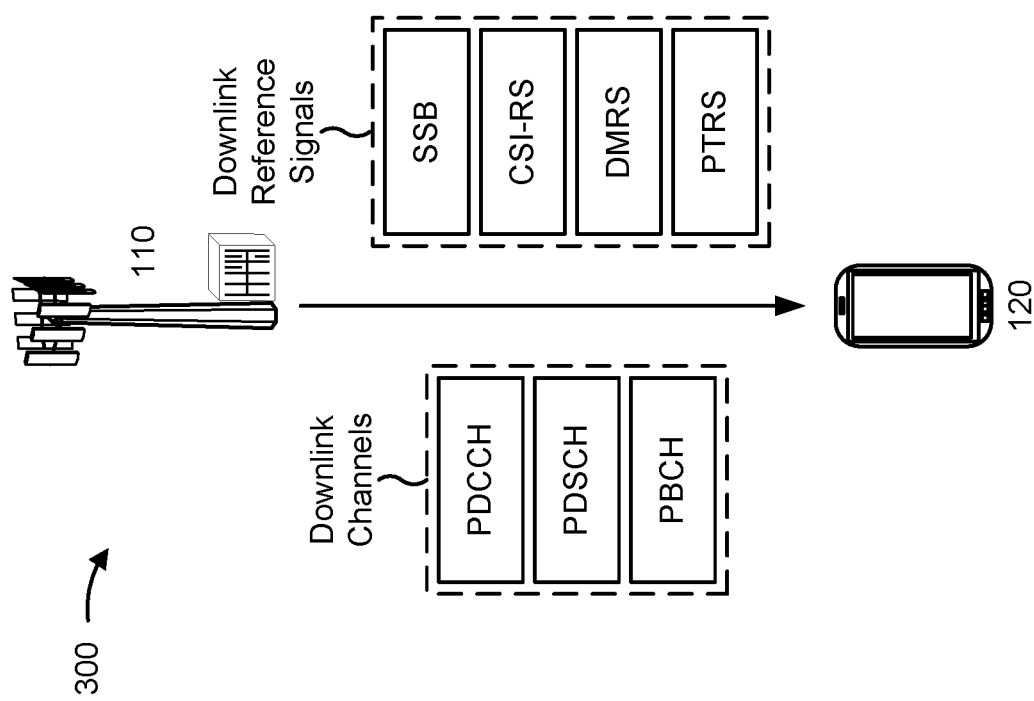

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. The base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

In some communications systems, a base station may broadcast system information to UEs in a cell. For example, the base station may transmit a master information block (MIB) on a physical broadcast channel (PBCH). Additionally, or alternatively, the base station may transmit a system information block (SIB) (e.g., SIB type-1 (SIB1) conveying remaining minimum system information (RMSI)) on a physical downlink shared channel (PDSCH) scheduled by a downlink control information scrambled using a system information (SI) radio network temporary identifier (RNTI). After the UE acquires system information for a cell, by receiving the MIB and/or the SIB, the UE may not re-acquire system information until the system information is updated.

To update system information, a base station may transmit an indication to UEs of a cell requesting that the UEs communicate with the base station to re-acquire the system information. In other words, a UE with first system information may communicate with the base station to acquire second system information that is an update to the first system information. In this case, the base station may transmit a short message, which may be a type of DCI, scrambled with a paging RNTI (P-RNTI). The UE may receive the short message and may determine to communicate with the base station to re-acquire the system information.

System information may include information enabling the UE to establish a connection to a network, monitor the network, and/or the like. For example, the system information may include information identifying a configuration of a set of paging channels, identifying a configuration of a set of random access procedures, identifying a set of neighboring cells, and/or the like. However, as new features are deployed in a network for new types of UEs, the system information may include information identifying additional configurations, such as a configuration for a two-step random access channel (RACH) procedure, a configuration or a power-efficient paging procedure, a configuration of resources for a particular service (e.g., a V2X service, an MTC service, a reduced capability (RedCap) service, a satellite service, etc.), and/or the like.

However, legacy types of UEs may not be compatible with some of the new features. For example, a first type of UE (e.g., a non-legacy UE) may be capable of using the power-efficient paging procedure, but a second type of UE (e.g., a legacy UE) may not be capable of using the power-efficient paging procedure. Moreover, some of the new features may update more frequently than other, legacy types of features. For example, a power-efficient paging procedure may be updated based at least in part on a cell condition, which may result in relatively frequent system information updates. As a result, a base station may transmit an indication to all UEs of a cell (the non-legacy or legacy UEs) requesting that the UEs are to re-acquire the system information. Frequent re-acquisition of system information may result in excessive utilization of network resources, excessive utilization of power resources, and/or the like by UEs that are not capable of using the features (legacy UEs), based at least in part on which a system information update is triggered.

Some techniques have been proposed to optimize system information update procedures. For example, a UE may parse a short message that includes a system information update notification to identify a set of UE capabilities for which the system information update message pertains. As a result, if the UE has a capability to which the system information update notification pertains (e.g., the UE is a first type of UE, such as a non-legacy UE), the UE may re-acquire system information. In contrast, if the UE does not have a capability for using a procedure whose configuration is to be updated with new system information (e.g., the UE is a second type of UE, such as a legacy UE), the UE may forgo re-acquiring system information and may continue to use prior system information, which is unchanged with respect to aspects of the system information that the UE is capable of using.

However, using a short message may provide only a limited quantity of bits for indicating information regarding the system information that is to be updated. For example, a short message field of a DCI may include only 5 bits. As a result, information regarding which SIBs, of the system information, are to be updated may be limited, which may prevent the UE from accurately determining whether to re-acquire the SIBs. As an example, using a short message may prevent inclusion of information regarding SIB validity, which may prevent the UE from performing a validity check on currently stored SIBS and determining, based at least in part on a result of the validity check, whether to update the currently stored SIBs.

Some aspects described herein provide a two-step system information procedure to enable improved system information updating. For example, a UE may receive a first system information update notification (e.g., in a short message) and a second system information update notification (e.g., in another message or field that is larger than the short message but shorter than a complete SIB1). The UE (e.g., if the UE is a first type of UE, such as a non-legacy UE) may decode the first system information update notification to determine that a partial system information change is to occur, which may trigger the UE to decode the second system information update notification. The UE may decode the second system information update notification to determine whether to re-acquire one or more SIBs based at least in part on decoding the first system information update notification.

In this case, when the UE has one or more capabilities (e.g., associated with the UE being a first type of UE, such as a non-legacy UE) whose configurations are to be updated with new system information and when the UE determines that one or more current SIBs are invalid, the UE may re-acquire one or more SIBs. In contrast, when the UE does not have one or more capabilities (e.g., the UE is a second type of UE, such as a legacy UE) that are to be updated and/or does not have any invalid SIBs, the UE may forgo re-acquiring new system information. In this way, the UE reduces a messaging overhead for system information acquisition relative to using a SIB1 to signal new system information and increases a granularity of a decision to re-acquire new system information relative to a single-step short-message based system information update procedure.

Figure 4:
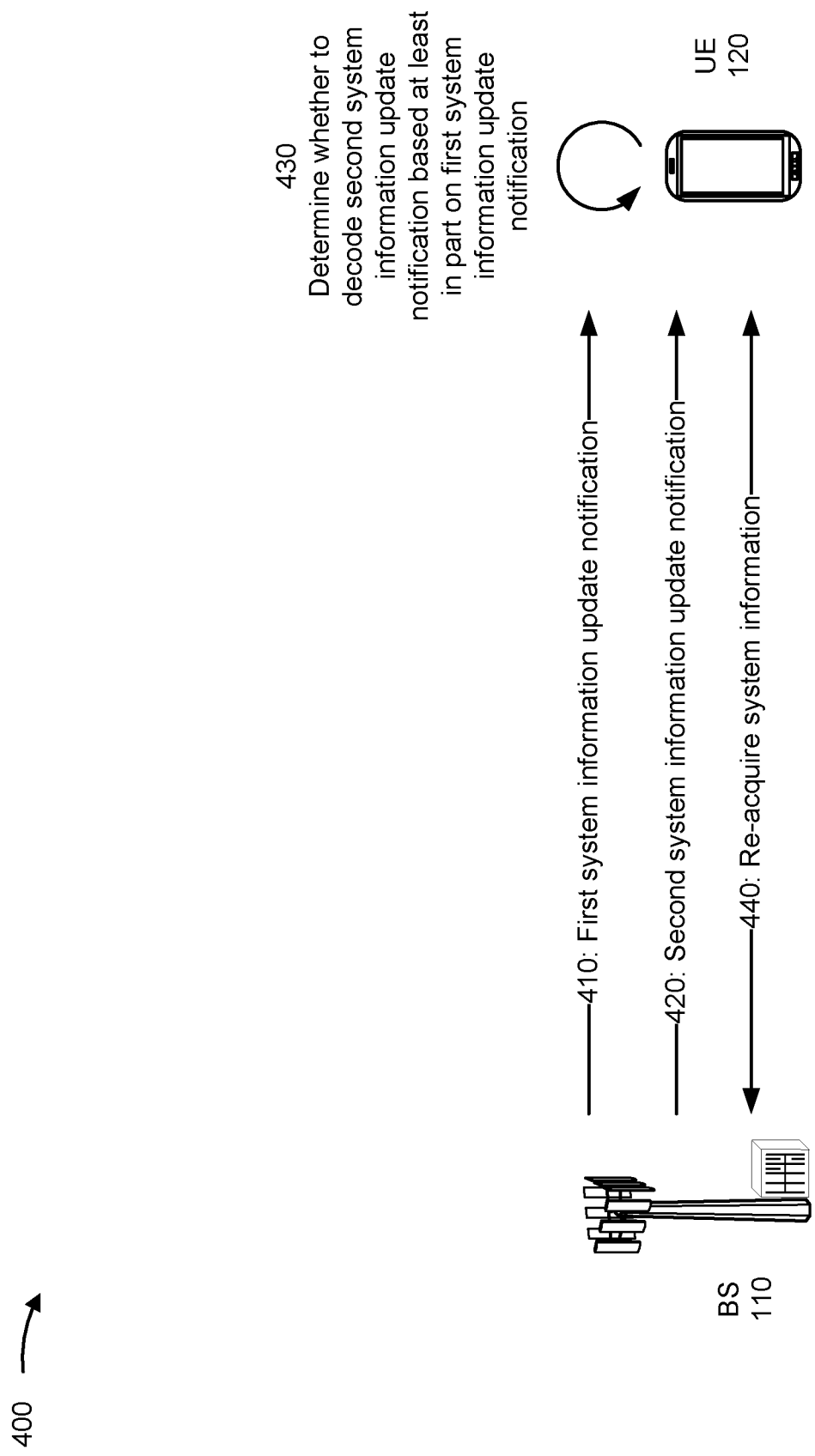
FIG. 4 is a diagram illustrating an example associated with two-stage system information update, in accordance with the present disclosure.

FIG. 4 is a diagram illustrating an example 400 associated with two-stage system information update, in accordance with various aspects of the present disclosure. As shown in FIG. 4, example 400 includes communication between a base station 110 and a UE 120. In some aspects, base station 110 and UE 120 may be included in a wireless network, such as wireless network 100. Base station 110 and UE 120 may communicate on a wireless access link, which may include an uplink and a downlink.

As further shown in FIG. 4, and by reference numbers 410 and 420, UE 120 may receive a first system information update notification and a second system information update notification. For example, base station 110 may generate and transmit, and UE 120 may receive a first message that includes the first system information update notification and a second message that includes the second system information update notification. Additionally, or alternatively, base station 110 may generate and transmit, and UE 120 may receive a single message that includes a first one or more fields for the first system information update notification and a second one or more fields for the second system information update notification.

In some aspects, the first system information update notification is included in a DCI. For example, UE 120 may receive a DCI with a short message field that includes a bit indicator. In this case, UE 120 may parse the bit indicator to determine that the short message field is indicating a partial system information update. In this case, when the UE 120 is a first type of UE (e.g., a non-legacy UE) with a particular capability, UE 120 may decode the second system information update notification to determine which SIBs or parts of SIBs are to be updated and re-acquired in connection with the partial system information update. In contrast, when the UE 120 is a second type of UE (e.g., a legacy UE) without a particular capability, UE 120 may not decode the second system information update notification. In other words, a legacy type of UE may update capabilities and system information blocks relating to the first system information update, but may not update capabilities and system information blocks relating to the second system information update, whereas a non-legacy type of UE may update capabilities and system information blocks relating to the first system information update and the second system information update, as described in more detail herein.

In some aspects, the first system information update notification is included in a dedicated DCI format type of DCI. For example, UE 120 may receive a DCI with a format defined for providing the first system information update notification. Additionally, or alternatively, UE 120 may receive a DCI with a particular radio network temporary identifier (RNTI) that indicates that the DCI includes the first system information update notification. In this case, the RNTI may be different from a paging RNTI (P-RNTI) that may be used for other DCIs.

As further shown in FIG. 4, and by reference number 430, UE 120 may determine whether to decode the second system information update notification based at least in part on the first system information update notification. For example, UE 120 may parse the DCI including the first system information update notification to determine that a partial system information update procedure is triggered and may decode the second system information update notification to identify one or more SIBs that are to be re-acquired in entirety or in part. In some aspects, the second system information update notification is included in the same transmission (e.g., DCI) as the first system information update notification. For example, UE 120 may parse the DCI (e.g., a paging DCI) that included a first field (e.g., a short message field) for the first system information update notification to identify a second field for the second system information update notification. Additionally, or alternatively, UE 120 may parse a different DCI to identify the second system information update notification. Additionally, or alternatively, UE 120 may parse a physical downlink shared channel (PDSCH), scheduled by the DCI that included the first system information update notification, to identify the second system information update notification. In this way, UE 120 may determine one or more SIBs that are to be updated.

In some aspects, UE 120 may perform a validity check on one or more SIBs based at least in part on decoding the second system information update notification. For example, the second system information update notification may include a parameter for validity checking one or more SIBs, and UE 120 may perform the validity check (to determine whether the one or more SIBs are still valid). In this case, based at least in part on a result of the validity check, UE 120 may re-acquire system information for at least one invalid SIB (e.g., a SIB1, a MIB, and/or the like) or a part of SIB. In this way, UE 120 reduces an amount of decoding relative to decoding a whole SIB1 to check a validity of other SIBs.

As further shown in FIG. 4, and by reference number 440, UE 120 may re-acquire system information. For example, based at least in part on information included in the second system information update notification and/or a result of a validity check, UE 120 may communicate with base station 110 to update and/or re-acquire system information for one or more invalid SIBs.

As indicated above, FIG. 4 is provided as an example. Other examples may differ from what is described with respect to FIG. 4.

Figure 5:
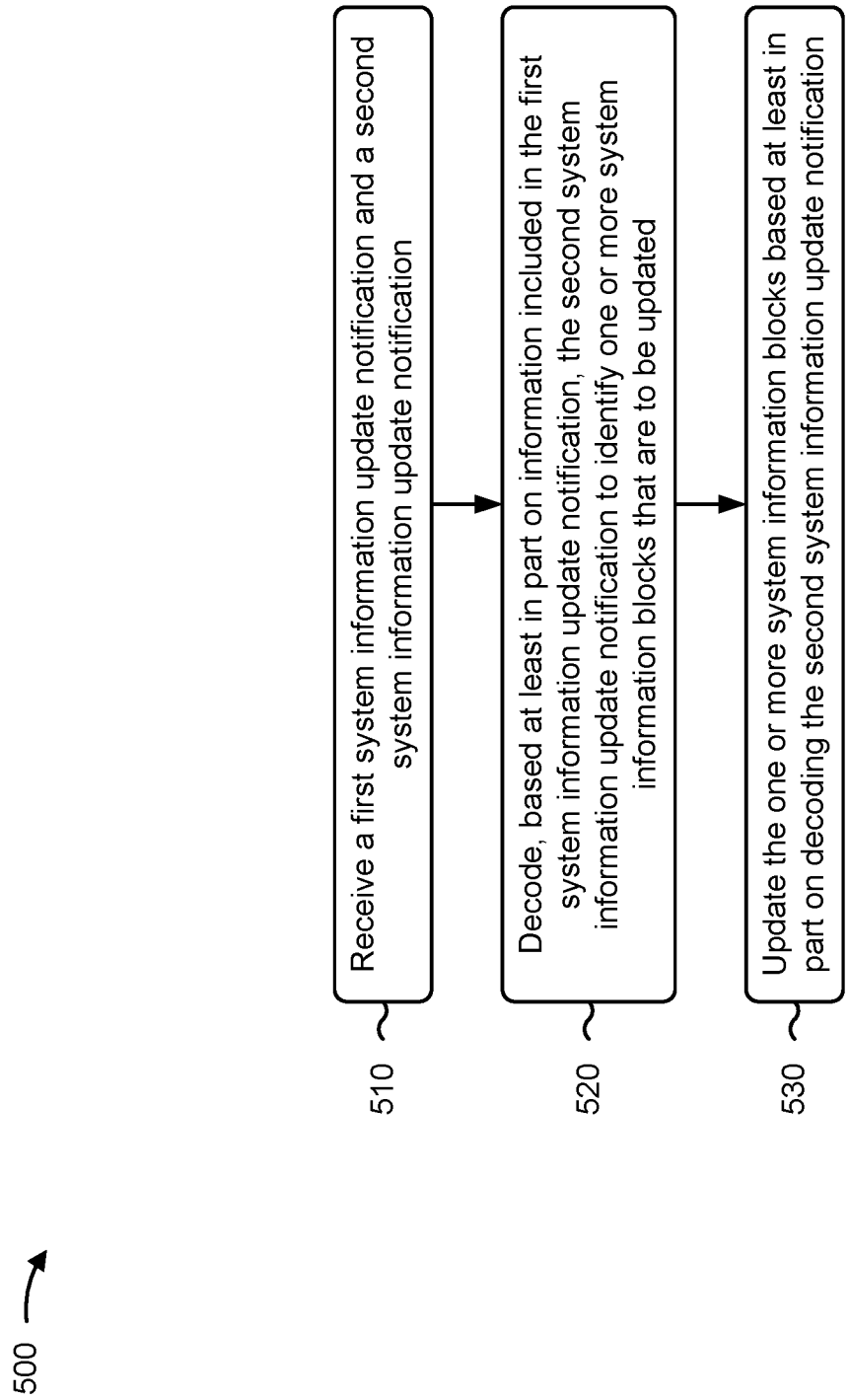
FIG. 5 is a diagram illustrating an example process associated with two-stage system information update, in accordance with the present disclosure.

FIG. 5 is a diagram illustrating an example process 500 performed, for example, by a user equipment (UE), in accordance with the present disclosure. Example process 500 is an example where the UE (e.g., UE 120) performs operations associated with two-stage system information update.

As shown in FIG. 5, in some aspects, process 500 may include receiving a first system information update notification and a second system information update notification (block 510). For example, the UE (e.g., using antenna 252, demodulator 254, MIMO detector 256, receive processor 258, controller/processor 280, and/or memory 282) may receive a first system information update notification and a second system information update notification, as described above.

As further shown in FIG. 5, in some aspects, process 500 may include decoding, based at least in part on information included in the first system information update notification, the second system information update notification to identify one or more system information blocks that are to be updated (block 520). For example, the UE (e.g., using antenna 252, demodulator 254, MIMO detector 256, receive processor 258, transmit processor 264, TX MIMO processor 266, modulator 254, controller/processor 280, and/or memory 282) may decode, based at least in part on information included in the first system information update notification, the second system information update notification to identify one or more system information blocks that are to be updated, as described above.

As further shown in FIG. 5, in some aspects, process 500 may include updating the one or more system information blocks based at least in part on decoding the second system information update notification (block 530). For example, the UE (e.g., using antenna 252, demodulator 254, MIMO detector 256, receive processor 258, transmit processor 264, TX MIMO processor 266, modulator 254, controller/processor 280, and/or memory 282) may update the one or more system information blocks based at least in part on decoding the second system information update notification, as described above.

Process 500 may include additional aspects, such as any single aspect or any combination of aspects described below and/or in connection with one or more other processes described elsewhere herein.

In a first aspect, the first system information update notification includes at least one of a short message on a downlink control information addressed to a paging radio network temporary identifier (P-RNTI), a downlink control information other than the downlink control information for the short message, or a radio network temporary identifier.

In a second aspect, alone or in combination with the first aspect, the second system information update notification includes an indicator associated with a validity check for a set of system information blocks stored by the UE.

In a third aspect, alone or in combination with one or more of the first and second aspects, process 500 includes performing the validity check for the set of system information blocks, wherein a result of the validity check is that the one or more system information blocks are invalid, and wherein updating the one or more system information blocks comprises updating the one or more system information blocks based at least in part on the one or more system information blocks being invalid.

In a fourth aspect, alone or in combination with one or more of the first through third aspects, the second system information update notification is a different message type and is associated with fewer bits than a system information block type 1.

In a fifth aspect, alone or in combination with one or more of the first through fourth aspects, the second system information update notification is conveyed via at least one of a same downlink control information that conveys the first system information update notification, a different downlink control information than the downlink control information that conveys the first system information update notification, a physical downlink shared channel message, or a paging physical downlink shared channel message.

In a sixth aspect, alone or in combination with one or more of the first through fifth aspects, the one or more system information blocks included at least one of a master information block, a system information block type 1, or a system information block of a type other than type 1.

In a seventh aspect, alone or in combination with one or more of the first through sixth aspects, updating the one or more system information blocks includes updating a system information block, of the one or more system information blocks, in part or in an entirety.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
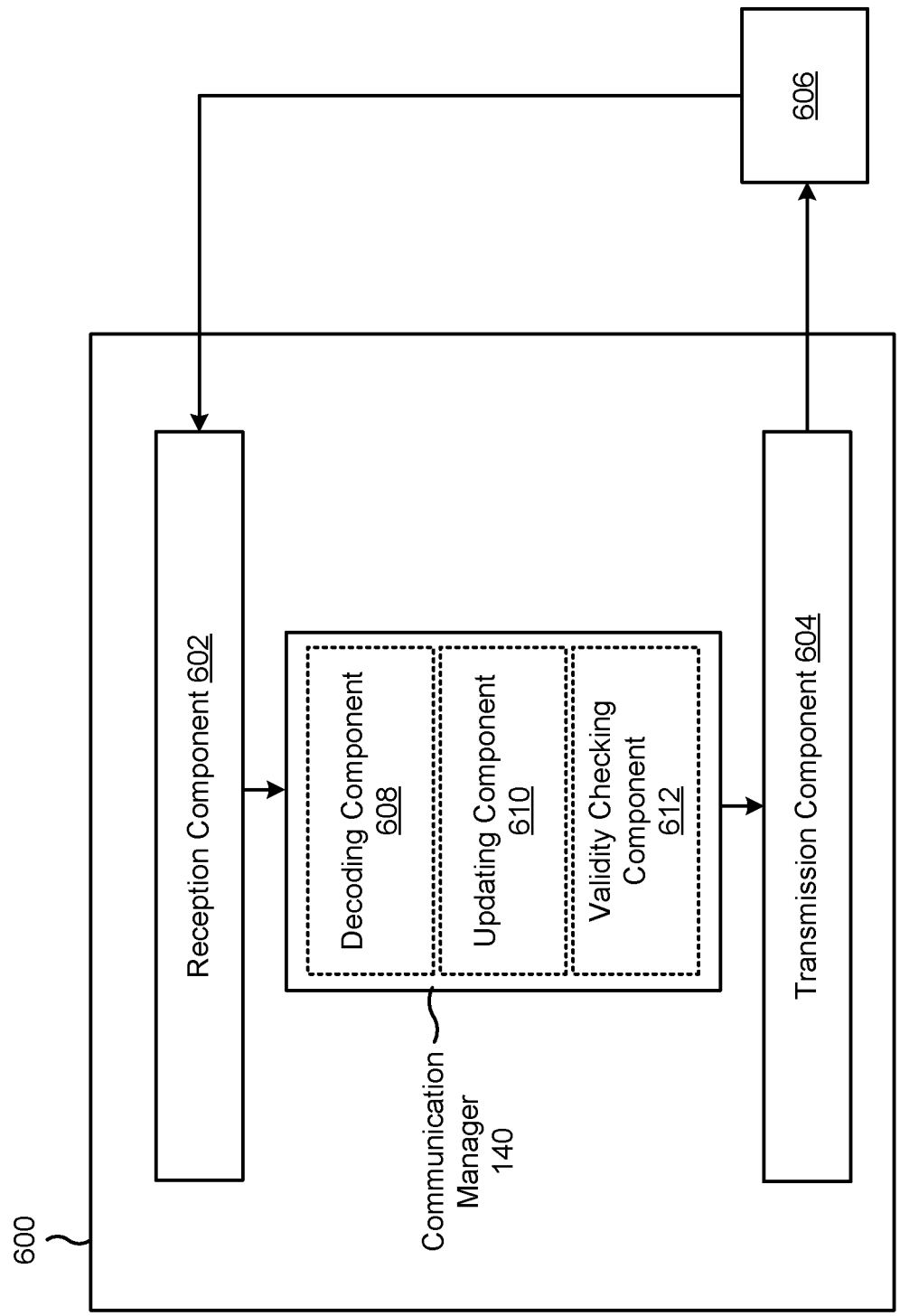
FIG. 6 is a diagram of an example apparatus for wireless communication, in accordance with the present disclosure.

FIG. 6 is a diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140. The communication manager 140 may include one or more of a decoding component 608, an updating component 610, or a validity checking component 612, among other examples.

In some aspects, the apparatus 600 may be configured to perform one or more operations described herein in connection with FIG. 4. Additionally, or alternatively, the apparatus 600 may be configured to perform one or more processes described herein, such as process 500 of FIG. 5. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a modem, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

The reception component 602 may receive a first system information update notification and a second system information update notification. The decoding component 608 may decode, based at least in part on information included in the first system information update notification, the second system information update notification to identify one or more system information blocks that are to be updated. The updating component 610 may update the one or more system information blocks based at least in part on decoding the second system information update notification.

The validity checking component 612 may perform the validity check for the set of system information blocks, wherein a result of the validity check is that the one or more system information blocks are invalid.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
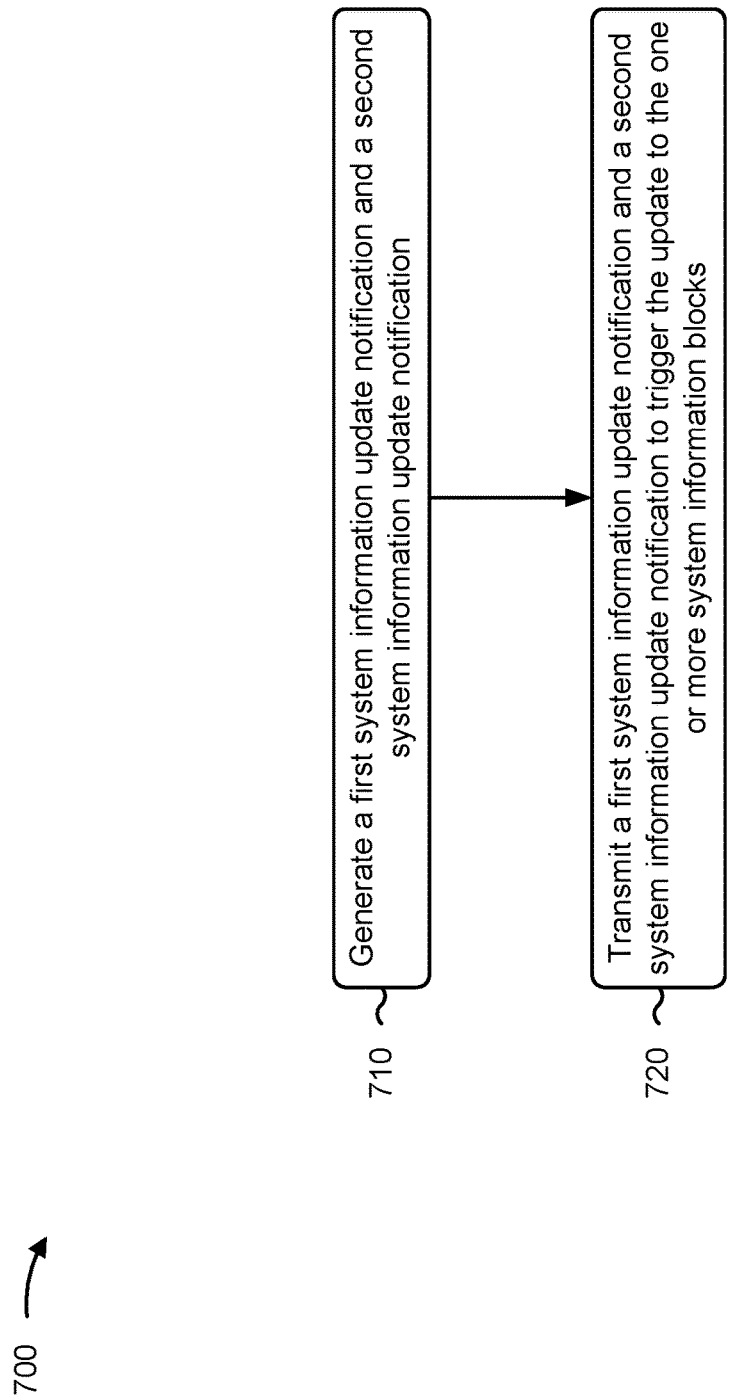
FIG. 7 is a diagram illustrating an example process associated with two-stage system information update, in accordance with the present disclosure.

FIG. 7 is a diagram illustrating an example process 700 performed, for example, by a base station, in accordance with the present disclosure. Example process 700 is an example where the base station (e.g., base station 110) performs operations associated with two-stage system information update.

As shown in FIG. 7, in some aspects, process 700 may include generating a first system information update notification and a second system information update notification (block 710). For example, the base station (e.g., using communication manager 150 and/or generation component 808, depicted in FIG. 8) may generate a first system information update notification and a second system information update notification, as described above. In some aspects, the first system information update notification includes information associated with decoding the second system information update notification. In some aspects, the second system information update notification is associated with identifying one or more system information blocks that are to be updated.

As further shown in FIG. 7, in some aspects, process 700 may include transmitting a first system information update notification and a second system information update notification to trigger the update to the one or more system information blocks (block 720). For example, the base station (e.g., using communication manager 150 and/or transmission component 804, depicted in FIG. 8) may transmit a first system information update notification and a second system information update notification to trigger the update to the one or more system information blocks, as described above.

Process 700 may include additional aspects, such as any single aspect or any combination of aspects described below and/or in connection with one or more other processes described elsewhere herein.

In a first aspect, the first system information update notification is decodable by a first type of UE, which is configured with a particular capability relating to the one or more system information blocks, and a second type of UE, which is configured without the particular capability, wherein second system information update notification is decodable by the first type of UE to trigger the update to the one or more system information blocks and not by the second type of UE.

In a second aspect, alone or in combination with the first aspect, transmitting the first system information update notification and the second system information update notification comprises transmitting the first system information update notification to trigger a first update to a first type of UE and a second type of UE, wherein the first system information update notification is decodable by the first type of UE and the second type of UE and relates to a first capability of the first type of UE and the second type of UE, and transmitting the second system information update notification to trigger a second update to the first type of UE and not the second type of UE, wherein the second system information update notification is decodable by the first type of UE and not the second type of UE, and wherein the second system information update notification relates to a second capability, associated with the one or more system information blocks, of the first type of UE and not of the second type of UE.

In a third aspect, alone or in combination with one or more of the first and second aspects, the first system information update notification includes at least one of a short message on a downlink control information addressed to a paging radio network temporary identifier (P-RNTI), a downlink control information other than the downlink control information for the short message, or a radio network temporary identifier.

In a fourth aspect, alone or in combination with one or more of the first through third aspects, the second system information update notification includes an indicator associated with a validity check for a set of system information blocks.

In a fifth aspect, alone or in combination with one or more of the first through fourth aspects, process 700 includes updating the one or more system information blocks based at least in part on the one or more system information blocks being invalid for a recipient of the second system information update notification.

In a sixth aspect, alone or in combination with one or more of the first through fifth aspects, process 700 includes updating a system information block, of the one or more system information blocks, in part or in an entirety.

In a seventh aspect, alone or in combination with one or more of the first through sixth aspects, the one or more system information blocks included at least one of a master information block, a system information block type 1, or a system information block of a type other than type 1.

In an eighth aspect, alone or in combination with one or more of the first through seventh aspects, the second system information update notification is a different message type and is associated with fewer bits than a system information block type 1.

Ina ninth aspect, alone or in combination with one or more of the first through eighth aspects, the second system information update notification is conveyed via at least one of a same downlink control information that conveys the first system information update notification, a different downlink control information than the downlink control information that conveys the first system information update notification, a physical downlink shared channel message, or a paging physical downlink shared channel message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
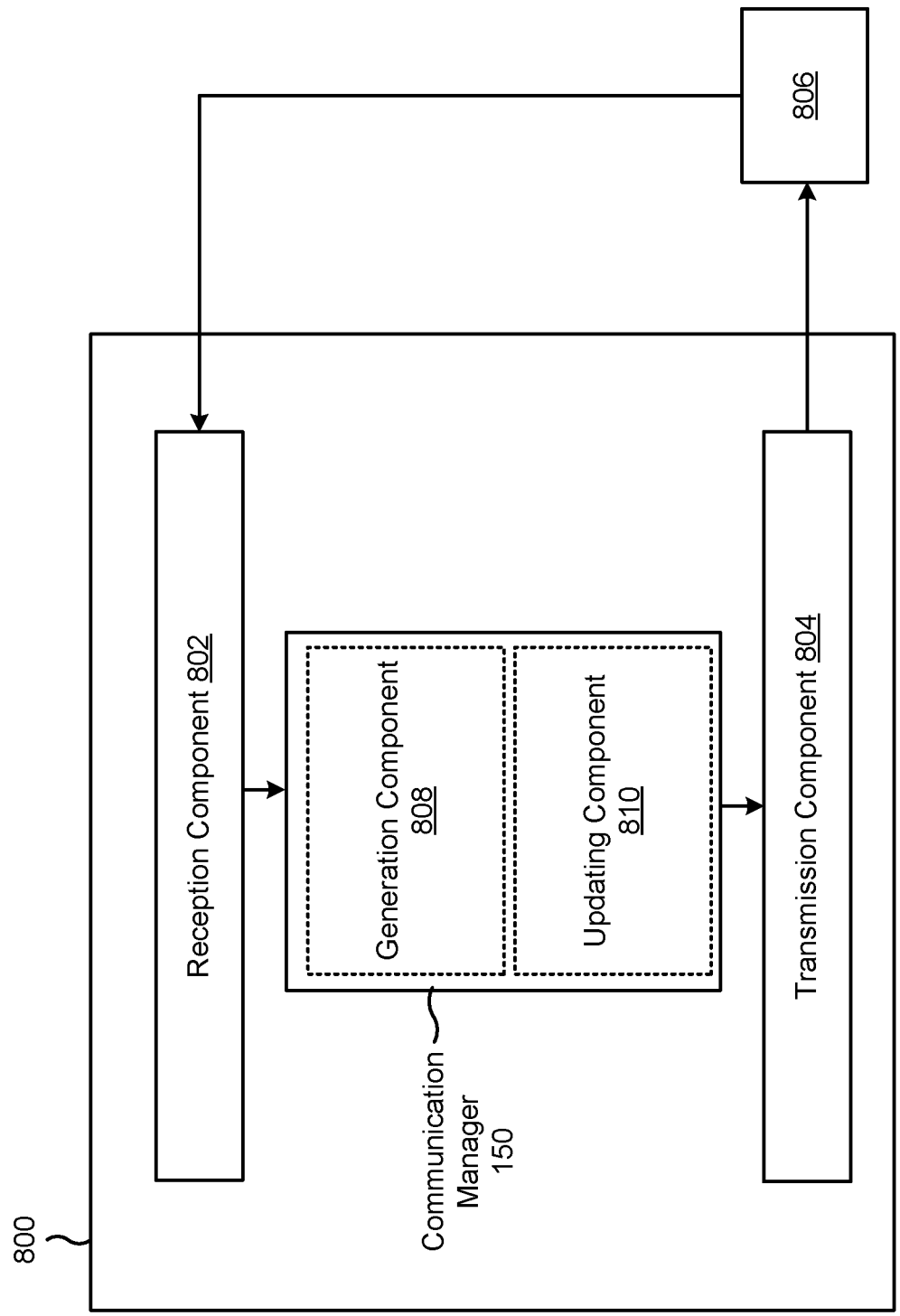
FIG. 8 is a diagram of an example apparatus for wireless communication, in accordance with the present disclosure.

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include one or more of a generation component 808 or an updating component 810, among other examples.

In some aspects, the apparatus 800 may be configured to perform one or more operations described herein in connection with FIG. 4. Additionally, or alternatively, the apparatus 800 may be configured to perform one or more processes described herein, such as process 700 of FIG. 7. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The generation component 808 may generate a first system information update notification and a second system information update notification wherein the first system information update notification includes information associated with decoding the second system information update notification, and wherein the second system information update notification is associated with identifying one or more system information blocks that are to be updated. The transmission component 804 may transmit a first system information update notification and a second system information update notification to trigger the update to the one or more system information blocks.

The updating component 810 may update the one or more system information blocks based at least in part on the one or more system information blocks being invalid for a recipient of the second system information update notification. The updating component 810 may update a system information block, of the one or more system information blocks, in part or in an entirety.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a first system information update notification and a second system information update notification; decoding, based at least in part on information included in the first system information update notification, the second system information update notification to identify one or more system information blocks that are to be updated; and updating the one or more system information blocks based at least in part on decoding the second system information update notification.

Aspect 2: The method of Aspect 1, wherein the first system information update notification includes at least one of: a short message on a downlink control information addressed to a paging radio network temporary identifier (P-RNTI), a downlink control information other than the downlink control information for the short message, or a radio network temporary identifier.

Aspect 3: The method of Aspect 1, wherein the second system information update notification includes an indicator associated with a validity check for a set of system information blocks stored by the UE.

Aspect 4: The method of Aspect 3, further comprising: performing the validity check for the set of system information blocks, wherein a result of the validity check is that the one or more system information blocks are invalid; and wherein updating the one or more system information blocks comprises: updating the one or more system information blocks based at least in part on the one or more system information blocks being invalid.

Aspect 5: The method of Aspect 1, wherein the one or more system information blocks included at least one of: a master information block, a system information block type 1, or a system information block of a type other than type 1.

Aspect 6: The method of Aspect 1, wherein updating the one or more system information blocks comprises: updating a system information block, of the one or more system information blocks, in part or in an entirety.

Aspect 7: The method of Aspect 1, wherein the second system information update notification is a different message type and is associated with fewer bits than a system information block type 1.

Aspect 8: The method of Aspect 1, wherein the second system information update notification is conveyed via at least one of: a same downlink control information that conveys the first system information update notification, a different downlink control information than the downlink control information that conveys the first system information update notification, a physical downlink shared channel message, or a paging physical downlink shared channel message.

Aspect 9: A method of wireless communication performed by a base station, comprising: generating a first system information update notification and a second system information update notification, wherein the first system information update notification includes information associated with decoding the second system information update notification, and wherein the second system information update notification is associated with identifying one or more system information blocks that are to be updated; and transmitting a first system information update notification and a second system information update notification to trigger the update to the one or more system information blocks.

Aspect 10: The method of Aspect 9, wherein the first system information update notification is decodable by a first type of UE, which is configured with a particular capability relating to the one or more system information blocks, and a second type of UE, which is configured without the particular capability, wherein second system information update notification is decodable by the first type of UE to trigger the update to the one or more system information blocks and not by the second type of UE.

Aspect 11: The method of any of Aspects 9 to 10, comprising: transmitting the first system information update notification to trigger a first update to a first type of UE and a second type of UE, wherein the first system information update notification is decodable by the first type of UE and the second type of UE and relates to a first capability of the first type of UE and the second type of UE; and transmitting the second system information update notification to trigger a second update to the first type of UE and not the second type of UE, wherein the second system information update notification is decodable by the first type of UE and not the second type of UE, and wherein the second system information update notification relates to a second capability, associated with the one or more system information blocks, of the first type of UE and not of the second type of UE.

Aspect 12: The method of any of Aspects 9 to 11, wherein the first system information update notification includes at least one of: a short message on a downlink control information addressed to a paging radio network temporary identifier (P-RNTI), a downlink control information other than the downlink control information for the short message, or a radio network temporary identifier.

Aspect 13: The method of any of Aspects 9 to 12, wherein the second system information update notification includes an indicator associated with a validity check for a set of system information blocks.

Aspect 14: The method of any of Aspects 9 to 13, further comprising: updating the one or more system information blocks based at least in part on the one or more system information blocks being invalid for a recipient of the second system information update notification.

Aspect 15: The method of Aspect 14, wherein updating the one or more system information blocks comprises updating a system information block, of the one or more system information blocks, in part or in an entirety.

Aspect 16: The method of any of Aspects 9 to 15, wherein the one or more system information blocks included at least one of: a master information block, a system information block type 1, or a system information block of a type other than type 1.

Aspect 17: The method of any of Aspects 9 to 16, wherein the second system information update notification is a different message type and is associated with fewer bits than a system information block type 1.

Aspect 17: The method of any of Aspects 9 to 13, wherein the second system information update notification is conveyed via at least one of: a same downlink control information that conveys the first system information update notification, a different downlink control information than the downlink control information that conveys the first system information update notification, a physical downlink shared channel message, or a paging physical downlink shared channel message.

Aspect 18: An apparatus for wireless communication at a device, comprising a processor; memory coupled with the processor; and instructions stored in the memory and executable by the processor to cause the apparatus to perform the method of one or more of Aspects 1-8.

Aspect 19: A device for wireless communication, comprising a memory and one or more processors coupled to the memory, the one or more processors configured to perform the method of one or more of Aspects 1-8.

Aspect 20: An apparatus for wireless communication, comprising at least one means for performing the method of one or more of Aspects 1-8.

Aspect 21: A non-transitory computer-readable medium storing code for wireless communication, the code comprising instructions executable by a processor to perform the method of one or more of Aspects 1-8.

Aspect 22: A non-transitory computer-readable medium storing a set of instructions for wireless communication, the set of instructions comprising one or more instructions that, when executed by one or more processors of a device, cause the device to perform the method of one or more of Aspects 1-8.

Aspect 23: An apparatus for wireless communication at a device, comprising a processor; memory coupled with the processor; and instructions stored in the memory and executable by the processor to cause the apparatus to perform the method of one or more of Aspects 9-17.

Aspect 24: A device for wireless communication, comprising a memory and one or more processors coupled to the memory, the one or more processors configured to perform the method of one or more of Aspects 9-17.

Aspect 25: An apparatus for wireless communication, comprising at least one means for performing the method of one or more of Aspects 9-17.

Aspect 26: A non-transitory computer-readable medium storing code for wireless communication, the code comprising instructions executable by a processor to perform the method of one or more of Aspects 9-17.

Aspect 27: A non-transitory computer-readable medium storing a set of instructions for wireless communication, the set of instructions comprising one or more instructions that, when executed by one or more processors of a device, cause the device to perform the method of one or more of Aspects 9-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        receive a first system information update notification and a second system information update notification;
        decode, based at least in part on information included in the first system information update notification, the second system information update notification to identify one or more system information blocks that are to be updated; and
        update the one or more system information blocks based at least in part on decoding the second system information update notification.

2. The UE of claim 1, wherein the first system information update notification is decodable by a first type of UE, which is configured with a particular capability relating to the one or more system information blocks, and a second type of UE, which is configured without the particular capability,
    wherein second system information update notification is decodable by the first type of UE to trigger the update to the one or more system information blocks and not by the second type of UE.

3. The UE of claim 1, wherein the first system information update notification includes at least one of:
    a short message on a downlink control information addressed to a paging radio network temporary identifier (P-RNTI),
    a downlink control information other than the downlink control information for the short message, or
    a radio network temporary identifier.

4. The UE of claim 1, wherein the second system information update notification includes an indicator associated with a validity check for a set of system information blocks stored by the UE.

5. The UE of claim 4, wherein the one or more processors are further configured to:
    perform the validity check for the set of system information blocks, wherein a result of the validity check is that the one or more system information blocks are invalid; and
    wherein the one or more processors, to update the one or more system information blocks, are configured to:
        update the one or more system information blocks based at least in part on the one or more system information blocks being invalid.

6. The UE of claim 1, wherein the one or more system information blocks included at least one of:
    a master information block,
    a system information block type 1, or
    a system information block of a type other than type 1.

7. The UE of claim 1, wherein the one or more processors, to update the one or more system information blocks, are configured to:
    update a system information block, of the one or more system information blocks, in part or in an entirety.

8. The UE of claim 1, wherein the second system information update notification is a different message type and is associated with fewer bits than a system information block type 1.

9. The UE of claim 1, wherein the second system information update notification is conveyed via at least one of:
    a same downlink control information that conveys the first system information update notification,
    a different downlink control information than the downlink control information that conveys the first system information update notification,
    a physical downlink shared channel message, or
    a paging physical downlink shared channel message.

10. A method of wireless communication performed by a user equipment (UE), comprising:
    receiving a first system information update notification and a second system information update notification;
    decoding, based at least in part on information included in the first system information update notification, the second system information update notification to identify one or more system information blocks that are to be updated; and
    updating the one or more system information blocks based at least in part on decoding the second system information update notification.

11. The method of claim 10, wherein the first system information update notification is decodable by a first type of UE, which is configured with a particular capability relating to the one or more system information blocks, and a second type of UE, which is configured without the particular capability,
    wherein second system information update notification is decodable by the first type of UE to trigger the update to the one or more system information blocks and not by the second type of UE.

12. The method of claim 10, wherein the first system information update notification includes at least one of:
    a short message on a downlink control information addressed to a paging radio network temporary identifier (P-RNTI),
    a downlink control information other than the downlink control information for the short message, or
    a radio network temporary identifier.

13. The method of claim 10, wherein the second system information update notification includes an indicator associated with a validity check for a set of system information blocks stored by the UE.

14. The method of claim 13, further comprising:
    performing the validity check for the set of system information blocks, wherein a result of the validity check is that the one or more system information blocks are invalid; and
    wherein updating the one or more system information blocks comprises:
        updating the one or more system information blocks based at least in part on the one or more system information blocks being invalid.

15. The method of claim 10, wherein the one or more system information blocks included at least one of:
    a master information block,
    a system information block type 1, or
    a system information block of a type other than type 1.

16. The method of claim 10, wherein updating the one or more system information blocks comprises:
   updating a system information block, of the one or more system information blocks, in part or in an entirety.

17. The method of claim 10, wherein the second system information update notification is a different message type and is associated with fewer bits than a system information block type 1.

18. The method of claim 10, wherein the second system information update notification is conveyed via at least one of:
   a same downlink control information that conveys the first system information update notification,
   a different downlink control information than the downlink control information that conveys the first system information update notification,
   a physical downlink shared channel message, or
   a paging physical downlink shared channel message.

19. A base station for wireless communication, comprising:
   a memory; and
   one or more processors, coupled to the memory, configured to:
      generate a first system information update notification and a second system information update notification,
         wherein the first system information update notification includes information associated with decoding the second system information update notification, and
         wherein the second system information update notification is associated with identifying one or more system information blocks that are to be updated; and
      transmit a first system information update notification and a second system information update notification to trigger the update to the one or more system information blocks.

20. The base station of claim 19, wherein the first system information update notification is decodable by a first type of UE, which is configured with a particular capability relating to the one or more system information blocks, and a second type of UE, which is configured without the particular capability,
   wherein second system information update notification is decodable by the first type of UE to trigger the update to the one or more system information blocks and not by the second type of UE.

21. The base station of claim 19, wherein the one or more processors, to transmit the first system information update notification and the second system information update notification, are configured to:
   transmit the first system information update notification to trigger a first update to a first type of UE and a second type of UE, wherein the first system information update notification is decodable by the first type of UE and the second type of UE and relates to a first capability of the first type of UE and the second type of UE; and
   transmit the second system information update notification to trigger a second update to the first type of UE and not the second type of UE, wherein the second system information update notification is decodable by the first type of UE and not the second type of UE, and wherein the second system information update notification relates to a second capability, associated with the one or more system information blocks, of the first type of UE and not of the second type of UE.

22. The base station of claim 19, wherein the first system information update notification includes at least one of:
   a short message on a downlink control information addressed to a paging radio network temporary identifier (P-RNTI),
   a downlink control information other than the downlink control information for the short message, or
   a radio network temporary identifier.

23. The base station of claim 19, wherein the second system information update notification includes an indicator associated with a validity check for a set of system information blocks.

24. The base station of claim 19, wherein the one or more processors are further configured to:
   update the one or more system information blocks based at least in part on the one or more system information blocks being invalid for a recipient of the second system information update notification.

25. The base station of claim 24, wherein the one or more processors, to update the one or more system information blocks, are configured to:
   update a system information block, of the one or more system information blocks, in part or in an entirety.

26. The base station of claim 19, wherein the one or more system information blocks included at least one of:
   a master information block,
   a system information block type 1, or
   a system information block of a type other than type 1.

27. The base station of claim 19, wherein the second system information update notification is a different message type and is associated with fewer bits than a system information block type 1.

28. The base station of claim 19, wherein the second system information update notification is conveyed via at least one of:
   a same downlink control information that conveys the first system information update notification,
   a different downlink control information than the downlink control information that conveys the first system information update notification,
   a physical downlink shared channel message, or
   a paging physical downlink shared channel message.

29. A method of wireless communication performed by a base station, comprising:
   generating a first system information update notification and a second system information update notification,
      wherein the first system information update notification includes information associated with decoding the second system information update notification, and
      wherein the second system information update notification is associated with identifying one or more system information blocks that are to be updated; and
   transmitting a first system information update notification and a second system information update notification to trigger the update to the one or more system information blocks.

30. The method of claim 29, wherein the first system information update notification is decodable by a first type of UE, which is configured with a particular capability relating to the one or more system information blocks, and a second type of UE, which is configured without the particular capability,
   wherein second system information update notification is decodable by the first type of UE to trigger the update to the one or more system information blocks and not by the second type of UE.

* * * * *